Figure 1:
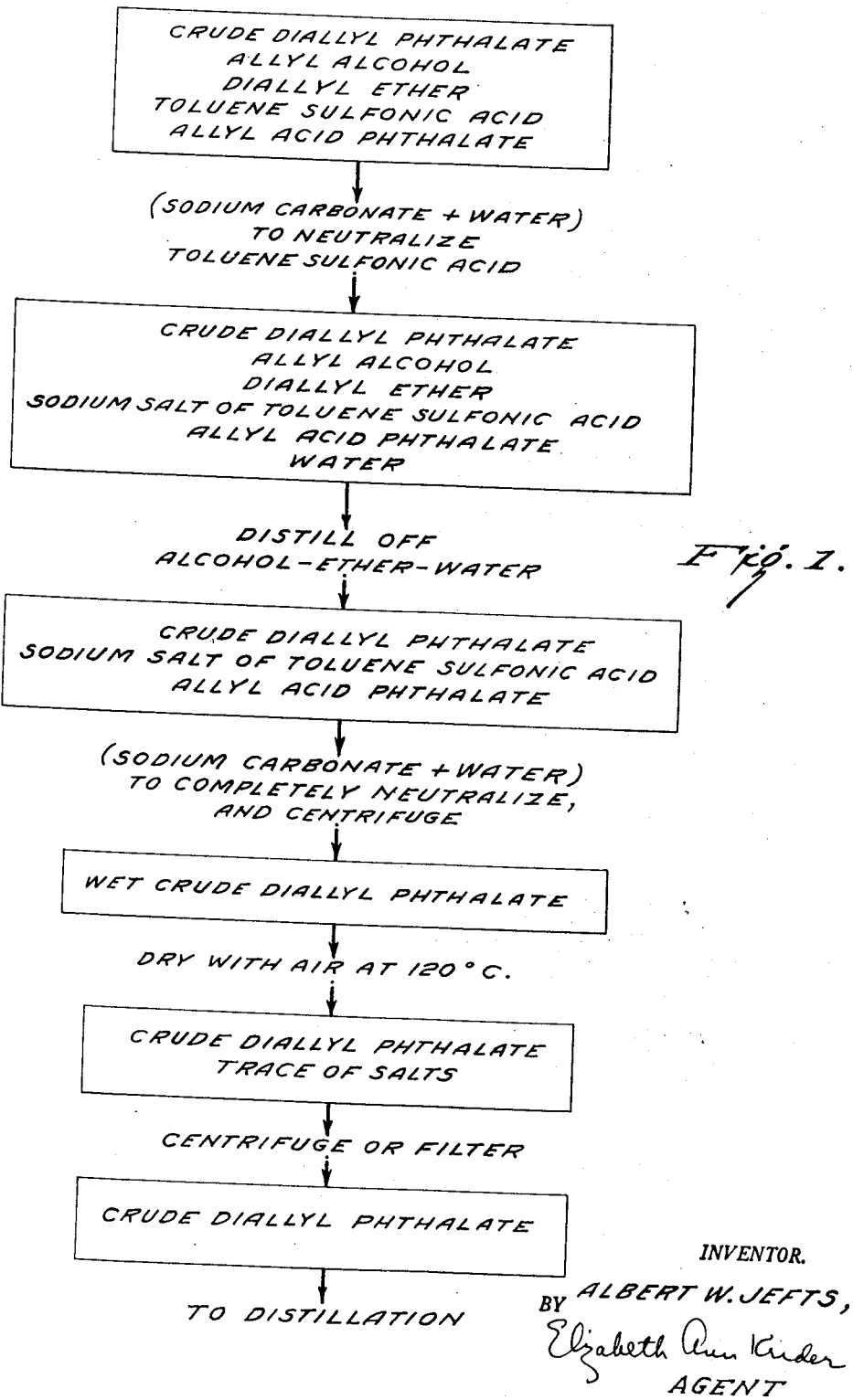

Patented Jan. 10, 1950

2,494,133

UNITED STATES PATENT OFFICE 2,494,133

METHOD OF NEUTRALIZING AND COMPLETELY REMOVING SALTS BEFORE DISTILLING CRUDE HIGH-BOILING ESTERS

Albert W. Jefts, Stamford, Conn., assignor to American Cyanamid Company, New York, N. Y., a corporation of Maine Application September 7, 1946, Serial No. 695,503

3 Claims. (Cl. 260—475)

This invention relates to the preparation of high-boiling esters and more particularly, to a method of treating crude high-boiling esters before their recovery in pure form by distillation.

High-boiling esters are usually prepared by direct esterification of the particular acid and alcohol. An excess of either or both principal ingredients is often used; sometimes an esterification catalyst is added to the reaction mixture. Under some conditions, the alcohol component of the mixture is converted into the corresponding ether and, when a polybasic acid is to be esterified, some acid ester may be formed. Accordingly, the esterification mixture from which the desired crude ester is to be separated and ultimately obtained in a pure form by a distillation process may contain besides the desired crude ester some or all of the following: acid ester, ether, excess alcohol, excess acid, an esterification catalyst which is generally a strong acid such as sulfuric acid, toluene sulfonic acid, etc. Attempts to recover the desired ester in a pure form by distillation directly from such a conglomerate mixture have been unsuccessful. Moreover, even when the crude ester is first separated from the other components of the esterification mixture and then distilled, poor yields of an inferior product may sometimes be obtained. I have found that success of the distillation process is apparently largely dependent upon the particular method by which the crude ester is separated from the esterification mixture.

It is an object of the present invention to completely neutralize an esterification mixture containing a crude high-boiling ester before recovery of the ester by distillation.

It is another object of the present invention to remove completely all salts present in an esterification mixture containing a crude high-boiling ester before distillation of the ester.

Still another object of the present invention is to increase the yield of pure high-boiling ester obtained upon distillation thereof from an esterification mixture containing crude high-boiling ester.

It is a further object of the present invention to provide an improved distillation process for high-boiling esters according to which heat transfer may be maintained at a high level without frequent washing of the heat exchangers due to complete removal of salts prior to the distillation process.

These and other objects are attained by a series of purification steps including addition to an esterfication mixture which contains crude ester and one or more of the following: excess alcohol and acidic impurities such as excess acid, acid ester, acid esterification catalyst, etc., of a quantity of an aqueous weak alkali such as sodium carbonate solution just sufficient to neutralize the acid esterification catalyst if it is present, distillation of low boilers including alcohol, ether and water from the partially neutralized esterification mixture, addition of a further quantity of aqueous sodium carbonate or other weak alkali sufficient to completely neutralize the esterification mixture, separation of substantially all the resulting salts from the crude ester, drying of the resulting crude ester at an elevated temperature and finally separation of any remaining salts from the crude ester which is then ready for final distillation.

Figure 2:
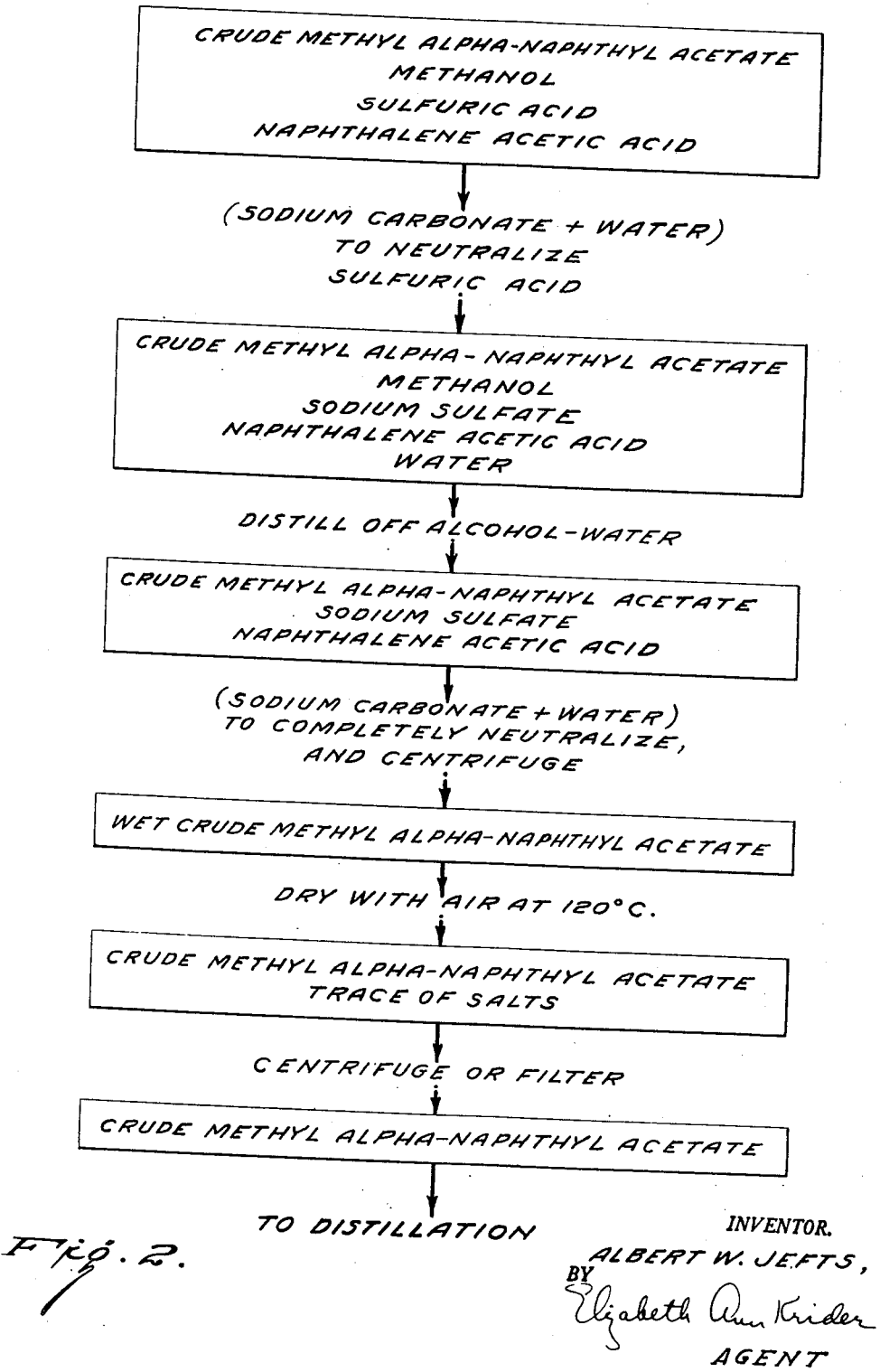

Typical esterification processes to which the improved procedure of the present invention may be applied are represented diagrammatically in the accompanying drawing in which Fig. 1 is a flow sheet indicating the steps involved in the purification of an esterification mixture of phthalic anhydride and allyl alcohol, and Fig. 2 is a flow sheet indicating the steps involved in the purification of an esterification mixture of methanol and naphthalene acetic acid.

Referring to Fig. 1, after the allyl alcohol, phthalic anhydride and toluene sulfonic acid catalyst have been permitted to react substantially completely, the esterification mixture contains crude diallyl phthalate, excess allyl alcohol, diallyl ether, toluene sulfonic acid and allyl acid phthalate. An aqueous solution of sodium carbonate is added in just sufficient quantity to neutralize the toluene sulfonic acid, and the reaction mixture then contains the sodium salt of toluene sulfonic acid instead of the free acid and, in addition, water. The alcohol, ether and water are removed by distillation, leaving only crude ester, acid ester and the sodium salt of the catalyst acid in the mixture. Additional sodium carbonate solution is added to neutralize the remaining acidity, i. e., the acid ester, and the sodium salts are removed by means of a centrifuge, leaving wet crude ester which is then blown with air at a temperature of about 120° C. The resulting crude ester containing a trace of additional salts is filtered or centrifuged and crude ester ready for distillation is recovered.

Similarly, referring to Fig. 2, methanol and naphthalene acetic acid are allowed to react in the presence of sulfuric acid catalyst. After esterification is complete, the reaction mixture contains crude methyl alpha-naphthyl acetate, methanol, naphthalene acetic acid and sulfuric acid. Treatment with an aqueous solution of sodium carbonate converts the sulfuric acid to sodium sulfate and adds water to the mixture. The water and methanol are distilled off and additional sodium carbonate solution is added to completely neutralize the crude ester-sodium sulfate-naphthalene acetic acid residue. The neutralized mixture is centrifuged to remove salts from the wet crude ester which is then blown with air at a temperature of about 120° C. Any trace of salts which remains to contaminate the crude ester is removed by filtration or centrifuging and a crude ester suitable for distillation so obtained.

The invention will be described in detail in conjunction with the following specific examples in which the proportions are given in parts by weight unless otherwise indicated. The examples are merely illustrative and it is not intended that the scope of the invention be limited to the details thereof.

*Example 1*

184 parts of phthalic acid anhydride, 158 parts of allyl alcohol and 1.7 parts of toluene sulfonic acid are charged into a kettle and heated until they go into solution and start refluxing. Refluxing is continued until the temperature of the batch reaches 120° C. and, with the temperature controlled at 120° C., a feed mixture containing 31.4% allyl alcohol, 65.7% diallyl ether and 2.9% water to which 1.17% by weight of toluene sulfonic acid has been added is added to the charge at a rate necessary to maintain reflux.

The distillate from the reaction mixture separates into two layers; the lower water layer is discarded and the upper layer containing allyl alcohol, diallyl ether and water is continuously returned to the reaction kettle. A cyclic operation is thus continued until reaction is complete.

After the reaction is complete, 3.4 parts of 20% aqueous sodium carbonate is added to the crude ester-containing mixture in the reaction kettle, an amount just sufficient to neutralize the toluene sulfonic acid catalyst, and the batch is then stripped of low-boiling material, i. e., alcohol, water, and ether, to a maximum temperature of 140° C. at 100 mm. Hg. The remaining acidity is then completely neutralized by the addition of 28.7 parts of 20% sodium carbonate solution and with the temperature held at 70°–80° C., the batch is centrifuged in order to separate the water and product layers. Air is then blown through the centrifuged product while it is heated to 120° C. for about one hour, and the dried product is again centrifuged to remove the last trace of foreign salts.

The crude diallyl phthalate obtained as a result of the above purification procedure is subjected to a high vacuum flash distillation process and diallyl phthalate which is water-white, slightly acidic, and has a density of 1.122 and a boiling point of 120° C. at about 0.7 mm. Hg is obtained.

*Example 2*

140 parts of methanol, 140 parts of crystalline naphthalene acetic acid and 600 parts of concentrated sulfuric acid are charged into a kettle and heated until distillation begins. Methanol is then added at a rate of 28 parts per hour and the distillate is removed at the same rate, the temperature being maintained at 70° C. The reaction is complete after about 4 hours.

The esterification mixture containing crude methyl-alpha-naphthyl acetate, methanol, sulfuric acid and naphthalene acetic acid is treated with 5 parts of a 20% aqueous solution of sodium carbonate which is just sufficient to neutralize the sulfuric acid esterification catalyst. Alcohol, water and any other low boilers are then distilled off, leaving in the reaction mixture crude ester, sodium sulfate and naphthalene acetic acid. An additional 12.5 parts of the 20% sodium carbonate solution are added until the naphthalene acetic acid is neutralized, and the resulting mixture is centrifuged at 80° C. in order to separate the water and product layers. The product layer which contains the crude ester is dried by blowing with air for about an hour while maintaining a temperature of about 120° C., the dried product is again separated by a centrifuge or filter of suitable type, and the crude ester so obtained is ready for distillation.

While the invention has been described in detail in conjunction with the preparation of diallyl phthalate and methyl alpha-naphthyl acetate, my process is in no sense limited to these particular high-boiling esters. Other esters to which it may be applied include high-boiling esters of oleic, linoleic, caprylic, benzoic, benzoylbenzoic, pyridine carboxylic, naphthalene carboxylic, naphthyl acetic, oxalic, malonic, succinic, adipic, suberic, sebacic, fumaric, maleic, tricarballylic, terephthalic, phthalic, etc., acids with methanol, ethanol, hexanol, cyclohexanol, benzyl alcohol, allyl alcohol, 4-methyl-pentene-3-ol-1, pentene-4-ol-2, crotonic alcohol, etc.

By high-boiling esters, as the term is used in this specification and in the claims appended hereto, is meant those esters which have a boiling point of more than 100° C. at about 1 mm. pressure.

Suitable salts which may be used as the neutralizing agents in my process include weakly alkaline salts which are sufficiently soluble in water to form about a 10%–30% solution such as the alkali metal and ammonium carbonates and bicarbonates. For example, sodium carbonate, potassium carbonate, potassium bicarbonate, ammonium carbonate, sodium bicarbonate, etc., are useful.

It is essential to the success of the process of the present invention that only enough alkali be added prior to stripping off of the low boilers to just neutralize the acid esterification catalyst. If no alkali is added before the low boilers are distilled off, the mixture as it becomes more and more concentrated becomes more strongly acid and this increased acidity has the disadvantage of effecting further decomposition of alcohol to corresponding ether. Since the increased acidity upon concentration is due primarily to the presence of the relatively strong catalyst acid in the mixture, enough alkali is added initially to neutralize this strong acid. It is impossible, however, to add all of the alkali necessary to neutralize the reaction mixture initially prior to stripping of low boilers due to the resultant formation of an extremely hard-to-handle gelatinous mass which can be neither washed nor filtered. This formation is probably at least partly due to hydrolysis of the ester.

The temperature to which the crude ester-containing partially neutralized reaction mixture is heated in order to effect removal of the low-boiling materials therein by distillation will vary from one ester to another depending upon the boiling point of the ester itself. In general, the temperature should be carried high enough to remove any water, alcohol or entraining organic liquid which is still present in the crude mixture without approaching the boiling point of the desired ester product too closely. In the specific application of the present process to the preparation of diallyl phthalate, for example, the "low boilers" constitute substances which boil up to a maximum temperature of about 140° C. at about 100 mm. Hg.

The salts obtained in the complete neutralization of the crude ester-containing mixture and after drying of the crude ester at an elevated temperature may be separated from the crude ester in any convenient manner. I prefer, in general, to make use of a centrifuge to separate the water and product layers but any suitable type filter or means of separation may be substituted therefor.

The crude ester obtained after the salts have been separated from the completely neutralized esterification mixture may be dried at a temperature of from about 100° C. to about 140° C. Excellent results are obtained if the crude ester is dried at about 120° C. Complete removal of salts can only be achieved if this drying of the crude ester is effected under vacuum or if air is blown through the ester during the drying procedure.

I have found that a high yield of pure high-boiling ester by distillation of the corresponding crude ester is dependent upon how completely salts and other extraneous substances are removed from the crude ester before distillation. For example, in the preparation of diallyl phthalate complete removal of the salts formed when the crude reaction product is washed with sodium carbonate or other similar solution reduces the residue obtained after distillation of the ester from about 5% to about 2%. When the crude reaction mixture is treated with sodium carbonate, filtered and distilled without drying there are obtained 94.7% distilled ester, 1.3% low boilers and 4.0% residue. On the other hand, when the crude ester is treated with sodium carbonate or other alkali, dried, filtered and distilled there are obtained 97.9% ester, no low boilers and only 2.1% residue.

It is an advantage of the process of the present invention that by its application heat transfer in the distillation of high-boiling esters may be maintained at a high level without frequent washing of the heat exchangers being necessary. Thus, it will be seen that the process of the present invention improves both the distillation properties and the distillation yields of high boiling esters.

I claim:

1. In the preparation of high-boiling esters by direct esterification of a monohydric hydrocarbon alcohol and an acid and separation of the ester so obtained by distillation from the reaction mixture, the improvement which includes the steps of adding to the reaction mixture which comprises crude ester, acid esterification catalyst, alcohol and acidic impurities, a quantity of an aqueous solution of a weakly alkaline salt just sufficient to neutralize said acid esterification catalyst, distilling off low boilers, adding a further quantity of an aqueous solution of a weakly alkaline salt sufficient to completely neutralize said crude ester-containing reaction mixture, separating substantially all the salts so produced from the wet crude ester, completely drying the wet crude ester, and removing any salts still contained therein from the crude ester.

2. In the preparation of diallyl phthalate by direct esterification of allyl alcohol and phthalic acid anhydride and separation of the diallyl phthalate so obtained by distillation from the reaction mixture, the improvement which includes the steps of adding to the reaction mixture, which comprises crude diallyl phthalate, acid esterification catalyst, allyl alcohol, diallyl ether, and allyl acid phthalate, a quantity of an aqueous solution of a weakly alkaline salt just sufficient to neutralize said acid esterification catalyst, distilling off low boilers including said allyl alcohol, diallyl ether and water, adding a further quantity of an aqueous solution of a weakly alkaline salt sufficient to completely neutralize said crude diallyl phthalate-containing reaction mixture, separating substantially all the salts so produced from the wet crude diallyl phthalate, completely drying the wet crude diallyl phthalate, and removing any salts still contained therein from the crude diallyl phthalate.

3. A process which comprises reacting methyl alcohol with naphthalene acetic acid in the presence of sulfuric acid, adding to the reaction mixture, which contains crude methyl alpha-naphthyl acetate, methyl alcohol, naphthalene acetic acid and sulfuric acid, a quantity of an aqueous solution of a weakly alkaline salt of an alkali metal just sufficient to neutralize the sulfuric acid, distilling off low boilers including methyl alcohol and water, adding a further quantity of an aqueous solution of a weakly alkaline salt of an alkali metal sufficient to completely neutralize said crude methyl alpha-naphthyl acetate-containing reaction mixture, separating substantially all the alkali metal salts so produced from the wet crude methyl alpha-naphthyl acetate, completely drying the wet crude methyl alpha-naphthyl acetate, removing any alkali metal salts contained therein from the crude methyl alpha-naphthyl acetate, and recovering pure methyl alpha-naphthyl acetate by vacuum distillation of the crude methyl alpha-naphthyl acetate from which salts have been removed.

ALBERT W. JEFTS.

REFERENCES CITED

The following references are of record in the file of this patent:

UNITED STATES PATENTS

| Number | Name | Date |
|---|---|---|
| 2,140,694 | Evans | Dec. 20, 1938 |
| 2,173,124 | Meyer et al. | Sept. 19, 1939 |
| 2,249,768 | Kropa | July 22, 1941 |
| 2,405,842 | Magrane | Aug. 13, 1946 |